(12) United States Patent
Langsdorf et al.

(10) Patent No.: US 7,814,765 B2
(45) Date of Patent: Oct. 19, 2010

(54) FLOAT GLASS PROCESS FOR MAKING THIN FLAT GLASS AND THIN FLAT GLASS SUBSTRATE MADE WITH SAME

(75) Inventors: Andreas Langsdorf, Ingelheim (DE); Ulrich Lange, Mainz (DE); Armin Vogl, Jena (DE); Andreas Morstein, Jena (DE); Andreas Roters, Mainz (DE)

(73) Assignee: Schott AG, Mainz (DE)

( * ) Notice: Subject to any disclaimer, the term of this patent is extended or adjusted under 35 U.S.C. 154(b) by 393 days.

(21) Appl. No.: 11/260,605

(22) Filed: Oct. 27, 2005

(65) Prior Publication Data

US 2006/0110603 A1    May 25, 2006

(30) Foreign Application Priority Data

Oct. 29, 2004    (DE) ................ 10 2004 052 568

(51) Int. Cl.
  *C03B 18/00*    (2006.01)
  *C03B 18/04*    (2006.01)
  *C03B 18/06*    (2006.01)

(52) U.S. Cl. .................. 65/99.5; 65/99.1; 65/99.6; 65/199

(58) Field of Classification Search .......... 65/99.2, 65/99.1, 66, 90, 182.1, 91, 99.5, 99.6, 100, 65/101, 193, 199, 200, 201, 205, 206, 336
See application file for complete search history.

(56) References Cited

U.S. PATENT DOCUMENTS

| 3,468,653 A | 9/1969 | Robinson et al. |
| 3,479,171 A | 11/1969 | Robinson et al. |
| 3,607,203 A | 9/1971 | Fujimoto |
| 3,771,985 A * | 11/1973 | Dickinson ............ 65/99.3 |
| 3,790,361 A | 2/1974 | Lawrenson |
| 4,099,952 A * | 7/1978 | Schwenninger ...... 65/182.3 |
| 4,116,661 A | 9/1978 | Edge et al. |
| 4,138,239 A * | 2/1979 | Nier et al. .......... 65/182.3 |
| 4,421,541 A | 12/1983 | Eischen et al. |
| 5,948,133 A * | 9/1999 | Iga et al. ............ 65/99.2 |

FOREIGN PATENT DOCUMENTS

| DE | 1 771 762 | 2/1972 |
| EP | 0 031 772 | 7/1981 |
| JP | 2000-313628 | 11/2000 |
| JP | 2003313628 | 11/2003 |
| JP | 2004-87382 | 3/2004 |

OTHER PUBLICATIONS

Uhlmann: Glass: Science and Technology: vol. 2, Processing I; Academic Press, Inc. 1984, pp. 83-106 (In English).

* cited by examiner

*Primary Examiner*—Jason L Lazorcik
*Assistant Examiner*—Cynthia Szewczyk
(74) *Attorney, Agent, or Firm*—Michael J. Striker

(57) ABSTRACT

The thin flat glass substrate, especially for display engineering, has a thickness of less than 1.5 mm, a length of at least 1800 mm, a width of at least 1800 mm and a difference between a smallest thickness and largest thickness of less than 50 μm. The float glass process for making the improved flat glass substrate provides flags (9) in the molten metal bath in the hot-spread region on both sides of the forming glass sheet, to minimize the variation in thickness of the thin flat glass substrate formed by the process.

4 Claims, 4 Drawing Sheets

FLOAT GLASS PROCESS FOR MAKING THIN FLAT GLASS AND THIN FLAT GLASS SUBSTRATE MADE WITH SAME

BACKGROUND OF THE INVENTION

1. The Field of the Invention

The present invention relates to a thin flat glass substrate with a thickness of less than 1.5 mm and to a method for manufacturing this sort of thin flat glass substrate.

2. Related Art

Thin flat glass substrates are, among other things, used to make flat display screens, e.g. plasma display panels (PDP), field emission displays (FED), TFT liquid crystal display screens (TFT=thin film transistor), STN-liquid crystal display screens (STN=Super twisted nematic), PALC display screens (PALC=Plasma assisted liquid crystal), EL displays (EL electroluminescent) and the like.

In flat display screens either a thin layer of liquid crystal compound is placed between two glass panels or respective dielectric layers are applied to the front and rear side of the rear and/or front glass panels, from which cells are formed, in which a phosphor is placed, according to the type of display.

It is important that the layer thickness of the liquid crystal layer and/or the thickness of the dielectric layer is maintained exactly so that especially in the case of display screens with comparatively large dimensions no disturbing color adulteration or brightness variations (shadows) occur. Since layer thickness (currently about 30 microns) is always becoming smaller and display screens are always becoming larger, these requirements have attained increasing importance.

Although float glass is excellently suited for display applications because of its fire polished surface, it has not been possible to make display glass with thickness variations of less than 50 μm according to the float process with the currently required large substrate format with edge lengths of above 1800 mm.

The presence of flows in the float bath, which usually comprise melted tin, explains the presence of thickness variations in float glass. These very complex flows are the result of opposing mechanical and thermally induced flows, i.e. the flow dynamics and thermal effects overlap or are superimposed on each other.

A flow in the motion direction of the glass sheet, i.e. a flow of the hot section of the tin bath in the direction of the cold section arises directly under the glass sheet due to the motion of the glass sheet. In the free surface of the tin bath beside the glass sheet a return flow, i.e. a flow in the opposite direction, arises so that the colder tin flows in the direction of the hotter front section of the tin bath. Temperature non-uniformities, which are transferred to the hot forming glass sheet and lead to viscosity non-uniformities, arise because of the mixing of these flows. These viscosity changes can then lead to undesired thickness fluctuations and waviness in the glass sheet. These fluctuations are the more noticeable, the more strongly the glass sheet is drawn out, i.e. the thinner the glass sheet becomes during manufacture.

Attempts have already previously been made to prevent and/or suppress these lateral return flows by building flow barriers, so-called flags, e.g. as described in DE-PS 1771 762 or DE-PS 2146 063. According to DE-PS the return flow is channeled by means of barriers or dam. The return flow formed between the lateral walls of the float tank and the barriers is suppressed or prevented by means of resistance bodies adjustable in their height and immersed in the return flow. DE-PS 2146 063 describes a special bottom structure for a float bath for guiding the underflow of bath liquid at the bottom of the flow bath, which prevents the lateral return flow by means of lateral baffle plates immersed in the flow bath (FIG. 8 of this reference). EP 031 772 B1 describes the arrangement and action of flags in great detail. In this reference it is also shown that these flags can be arranged not only transversely to the feed direction of the glass sheet, but also can be at an angle to it. In JP 2000-313628 a flag is shown, which is arranged substantially under the bath surface. The angle, at which this flag is immersed in the molten metal, can be adjusted as well as the distance between the flag and the glass sheet.

In spite of the improvements in the flat glass manufacturing process up to now it has not been possible to make large-area thin flat glass substrates with a thickness of less than 1.5 mm, which met high quality specifications.

SUMMARY OF THE INVENTION

It is an object of the present invention to provide a large surface or large area thin flat glass substrate, especially for display engineering, with a thickness of less than 1.5 mm, which meets high quality requirements, especially regarding permitted thickness variations.

It is also an object of the present invention to provide a process for making large area thin flat glass substrates, especially for display engineering, with a thickness of less than 1.5 mm and which have high quality, especially regarding thickness variations.

According to the invention the flat glass substrate has a thickness of less than 1.5 mm, a length of at least 1800 mm, a width of at least 1800 mm and a difference between a smallest and largest thickness of less than 50 μm.

According to the invention the float glass process for making this flat glass substrate includes the steps of:

a) pouring a hot glass melt on a molten metal bath so that melted glass spreads out on the molten metal bath because of the action of gravity to form a hot spread region;

b) arranging flags, which do not contact a glass sheet forming from the melted glass, in the molten metal bath in the hot spread region on both sides of the flowing melted glass; and c) imparting a final outlet speed to the glass sheet by accelerating the glass sheet.

The thin flat glass substrate according to the invention fulfills the required high quality requirements as it comes from the float plant, i.e. without subsequent polishing. If a polishing is still required for any reason, it can be performed especially economically and/or efficiently, since the polishing work is kept very small because of the high surface quality of the product coming from the float plant.

It was found that a flat glass substrate with a thickness of less than 1.5 mm, respective edge lengths of more than 1800 mm and with a difference between the smallest and largest thickness of less than 50 μm met the highest requirements of display engineering applications. Because of weight saving considerations the glass substrates with very large surface area should be made as thin as possible. These substrates have a preferred thickness of from 0.4 to 1.1 mm. If the thickness is less than 0.4 mm, the glass substrates is of course always still suitable for making a display however the handling of this sort of very thin substrate, especially with large dimensions, requires a clearly greater effort and/or expense. The thin flat glass substrates have a width of over 1800 mm; in practice from handling reasons alone they may only infrequently exceed a width of from 3.5 to 4 m. Also when even larger formats are made, they are produced in practice by long divisions of the given width format. Widths up to about 2.5 m are especially easily manipulated or handled and thus are preferred. The length of the thin glass substrate is in the same size range as the dimensions given for the width for the same reasons, namely to provide easy handling. Theoretically the length of the substrate has no limits because the manufacturing process is continuous. However since very thin glass bends very easily, the substrate can be marketed in a rolled-up form, i.e. as a roll, with a suitable bending radius. Furthermore it is advantageous when the difference between the smallest and the largest thickness is less than 30 µm, especially less than 15 µm, since the increasing requirements of the processing industries are taken into consideration. On account of the good surface quality of float glass, which has the quality of fire-polished glass, a float glass is preferred with the above-stated parameters. The glass according to the invention is especially suitable for use in TFT displays. For these applications a sodium-free glass except for unavoidable trace sodium ion impurities is used. Sodium ion content may not exceed 1000 ppm in these glasses.

In the known float glass process for making flat glass a melt is poured onto a molten metal bath and the liquid glass spreads on the metal melt, thus forming a hot spread region. The spreading of the glass is subsequently assisted by so-called top rollers, which engage at the edge of the glass sheet and draw the glass sheet out further. A final outlet speed is imparted to the glass sheet by acceleration in the flow direction of the glass sheet behind the top rollers, which takes the molten metal downstream under the glass sheet and leads to a colder return flow in the upstream direction. The part of the return flow formed beside the glass sheet in the drawing region in the free surface (an additional part of the return flow occurs in the deeper layers of the bath) is prevented or hindered by placing barriers (flags) in the side surfaces of the tin bath in this region.

It was surprisingly found that the placement of flags in a region of the float bath, in which no return flow exists at the surface and in which the flags should have scarcely any effect according to the conventional understanding, still clearly reduce the thickness variations in the product float glass. This region of the float bath is the hot spread region, also the region, in which the glass freely spreads further under the influence of gravity. It is located upstream of the top rollers in the flow direction of the glass sheet. The glass has a viscosity of less than $10^6$ dPas, especially a viscosity of $10^4$ to $10^6$ dPas, in this region.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
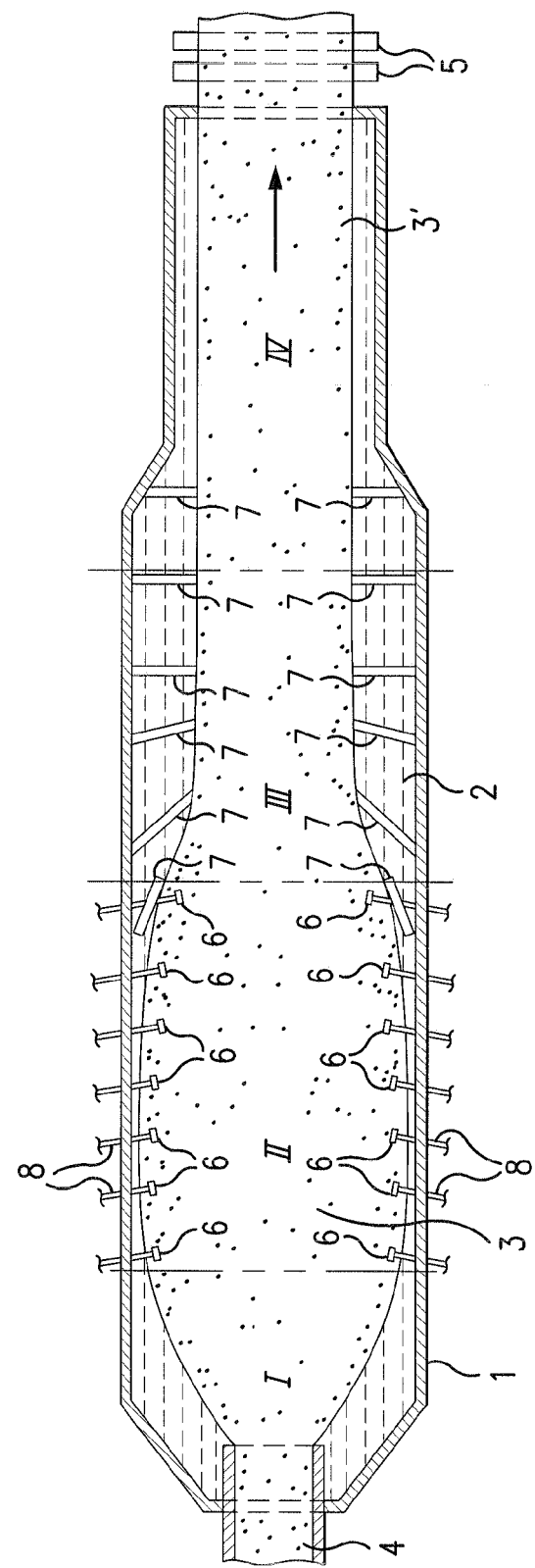
FIG. 1 is a schematic top plan view of a longitudinally extending float glass tank according to the prior art.

FIG. 1 shows a longitudinally extended float glass tank according to the prior art. The prior art float tank has sidewalls 1 and contains a bath 2 of melted tin. The glass sheet 3, which moves in the direction of the arrow, floats on the tin bath. The float tank has plural different sections or regions I to IV, which may differ from each other as follows.

In section I the fluid glass is poured on the tin bath and spreads out on it (Hot spread region).

In section II longitudinal forces and forces directed toward the outside are exerted under the influence of the top rollers and the outlet rollers, the glass is already drawn out and is thinner.

In section III the glass sheet attains its final form by action of the outlet rollers. Section II and III together form the drawing zone, i.e. the region, in which the glass is drawn out and attains its final form.

In section IV the glass solidifies and its cooling takes place.

The liquid glass 4 is poured on the tin bath 2 at the beginning of zone or section I and already spreads out there to its equilibrium thickness of about 6 to 7 mm. Subsequently it forms the finished glass sheet 3', which is drawn by the outlet rollers 5 from the float chamber. The desired thickness of the glass sheet is attained by the joint action of the top rollers 6 and the outlet rollers 5. The top rollers are driven with speeds adjusted to the increasing speed of the glass sheet from the outside of the tank. The top rollers are slightly inclined to the feed direction of the glass sheet, are driven by means of the shafts 8 and unshown drive motors and exert a pulling force from the outside on the glass, so that a preliminary tapering of the glass sheet occurs. The motion of the glass sheet in the drawing zone causes a flow of metal directly under the glass sheet in the same direction. This flow induces a corresponding reverse flow at the bottom and sides of the bath. This lateral flow is prevented and/or suppressed by means of lateral flags 7 projecting into the float bath.

Figure 2:
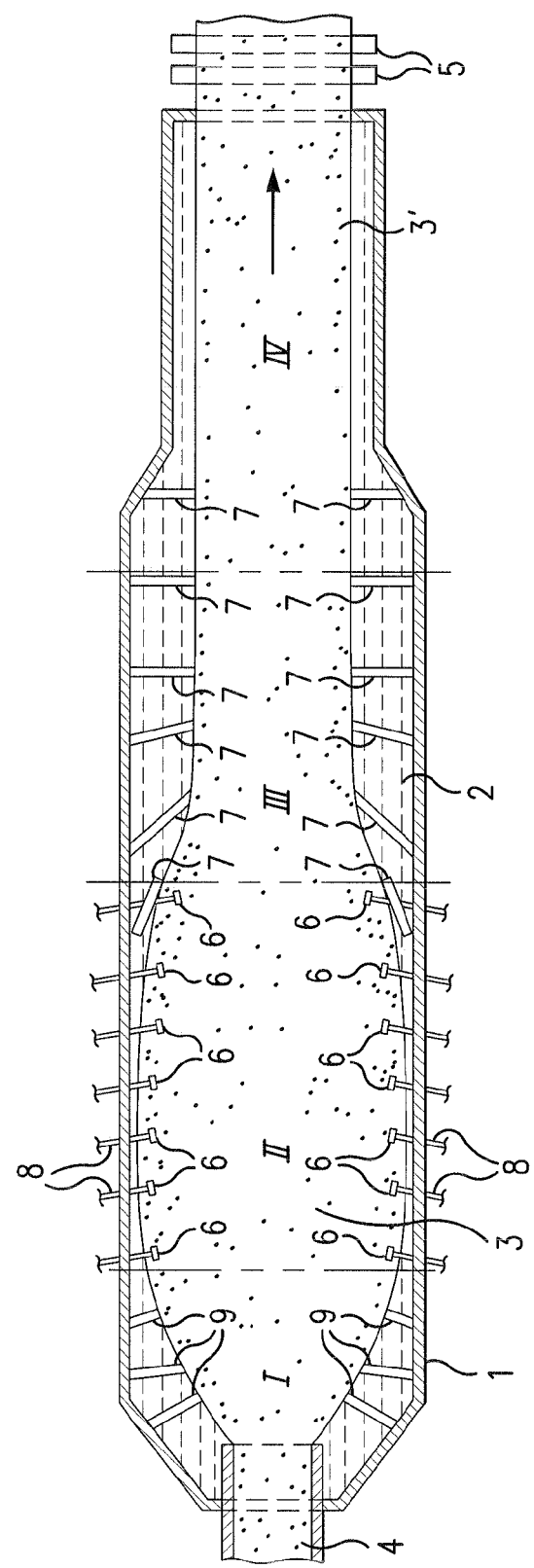
FIG. 2 is a schematic top plan view of a longitudinally extending float glass tank according to the present invention.

The float tank according to the invention shown in FIG. 2 differs from the prior art float tank shown in FIG. 1 because flags 9 are introduced in the melted tin beside the melted glass spreading out on the melted tin under the influence of gravitation in the hot spread region, i.e. in the region upstream or in front of the top rollers. The number of flags 9 depends on the size of the float chamber and/or the hot spread region. For optimum results one uses 1 to 3 flags on each side of the tank per meter of tank length in the hot spread region. However a definite improvement is already achieved with a respective flag 9 on each side of the tank. The glass quality may be improved with the flags according to the invention in the hot spread region in any float bath, even when no flags are present in the drawing region (sections II and III in FIGS. 1 and 2). All models conventionally used in float baths can be used as flags 9. The flags are plates, which are immersed in the bath between the walls of the float tank and the edge of the glass sheet and which are arranged substantially transverse to the feed direction of the glass sheet.

Figure 3A:
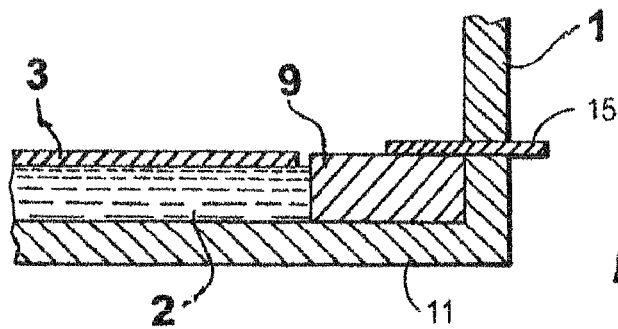
FIGS. 3a to 3c are respective cross-sectional views through the float glass tank according to the invention showing a flag.
Figure 3B:
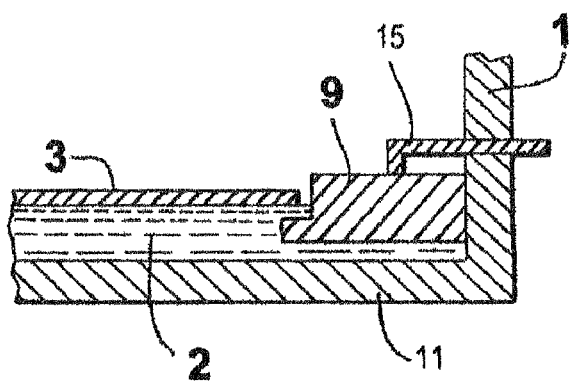
Figure 3C:
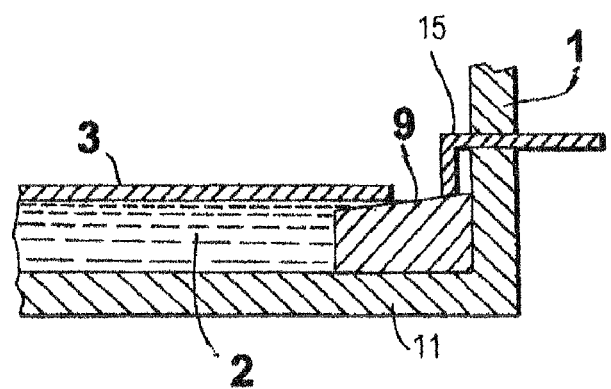

FIGS. 3a and 3c show respective cutaway side cross-sectional views of a float bath with sidewall 1 and bottom 11, tin bath 2 and glass sheet 3 floating on the tin bath. A flag 9 is introduced between the lateral edge of the glass sheet 3 and the tank wall 1, which extends from above into the tin bath 2. The flag 9 preferably extends to the bottom 11 of the float bath, however it can, as shown in FIG. 3b, be arranged with some spacing from the bottom. The spacing between the flag 9 and the sidewall 1 is kept as small as possible in order to maximize the effect of the flag. A small spacing of the flag from the container wall does not impair the action of the flag. However that spacing should not be too large, since otherwise the acting surface of the flag is reduced. The lateral spacing of the flag to the edge of the glass sheet 3 should similarly be as small as possible, however direct contact of the flag with the glass is undesirable. Distances of about 10 to 50 cm are preferred for reasons of easy handling and adjustment. The flag can, as shown in FIGS. 3b and 3c, extend under the edge of the glass sheet 3. In FIG. 3b that is caused by a step or shoulder in the flag, while in FIG. 3c the flag has an inclined upper edge. The flag 9 is attached to a handle 15, which is guided through the container wall 1 and is attached there in a conventional not illustrated manner. The flag 9 is usually arranged at an angle of 90° to the feed direction of the glass sheet 3, however it can be oriented at an angle to the feed direction for an especially exact adjustment of the action of the flag. The angle can be up to 30°, however should usually not be less than 45°. It is especially beneficial when the flag is equipped with an adjusting device by which its height, angle and spacing from the side wall 1, the glass sheet 3 and the spacing to the container bottom 11 can be adjusted. This adjusting means is especially not shown, since it can be set up with current engineering knowledge without difficulty. The upper edge of the flag 9 should be above the level of the bath in the side region. The use of completely immersed flags, e.g. known from JP 2003313628, leads to a poor action.

The material, from which the flag 9, is made, must be inert to metal and the protective gas over the float bath and can resist the high temperatures present in the gas chamber. For example, graphite, mullite, sillimanite, fused quartz and composition materials have proven suitable for the flag. The holder can be made of materials like e.g. tempered steel.

Clearly reduced thickness variations of the thin glass produced can be attained by the arrangement of the flags in the hot spread region. Furthermore the stability of the glass sheet in regard to its width and its positioning on the float bath could be clearly improved.

EXAMPLE

Figure 4:
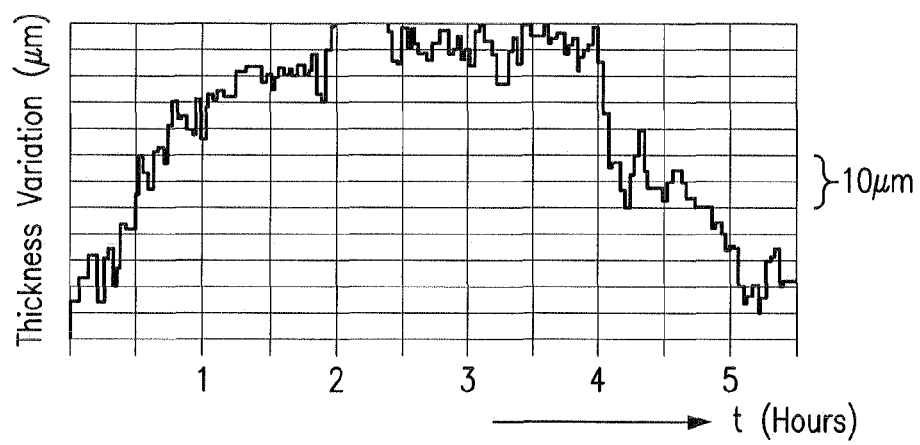
FIG. 4 is a graphical illustration showing the variation of thickness versus time for a flat glass substrate made with the float glass process of the prior art.
Figure 5:
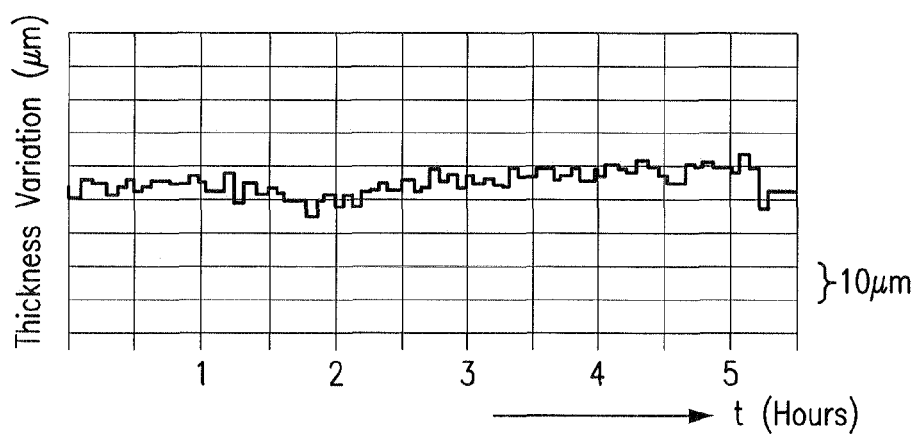
FIG. 5 is a graphical illustration showing the variation of thickness versus time for a flat glass substrate with the float glass process of the present invention.

A thin flat glass sheet with a thickness of about 0.7 mm was drawn in a conventional float plant according to the prior art. The thickness of the glass sheet leaving the float plant of the prior art was measured. This thickness is shown graphically in FIG. 4. The measurement occurred by a double reflection method, in which a laser contour line is projected on the glass sheet and the thickness is calculated from the spacing of the received reflections from the front side and the rear side of the glass sheet respectively. The thickness variation is shown in FIG. 4. Then a flag was inserted in the molten metal on both sides of the forming glass sheet with a spacing of about 3.5 m from the front side of the float bath (bath inlet) in each case. The angle of the flag to the lateral wall amounted to 90°, the spacing to the sidewall 0 cm and the spacing to the glass flow 20 cm. The flag had a height of 70 cm and rests on the float tank bottom. The thickness fluctuation attained according to this structure is shown in FIG. 5. The thickness variation of the prior art thin flat glass sheet or substrate determined from FIG. 4 is about 57 µm, while the corresponding thickness variation for the thin flat glass sheet or substrate according to the invention is about 18 µm.

The disclosure in German Patent Application 10 2004 052 568.4-45 of Oct. 29, 2004 is incorporated here by reference.

This German Patent Application describes the invention described hereinabove and claimed in the claims appended hereinbelow and provides the basis for a claim of priority for the instant invention under 35 U.S.C. 119.

While the invention has been illustrated and described as embodied in a float glass process for making thin flat glass and thin flat glass substrate made with same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A float glass process for making a flat glass substrate, said process consisting of the steps of:
    a) pouring a hot glass melt (4) on a molten metal bath (2) contained in a float tank, so that melted glass freely spreads out in a hot spread region (I) of the molten metal bath, said hot spread region being a section of the molten metal bath in which the melted glass freely spreads under the influence of gravity;
    b) placing flags (9), which do not contact a glass sheet (3,3') forming from the melted glass, in the molten metal bath in the hot spread region (I) on both sides of the melted glass with a height, an orientation, and with a spacing from a side wall of the float tank, a spacing from the melted glass, and a spacing from a bottom (11) of the float tank, so that thickness variations in the glass sheet forming from the melted glass are minimized;
    c) engaging the glass sheet with top rollers in a region of the metal bath that is downstream from the hot spread region to further draw out the glass sheet; and
    d) imparting a final outlet speed to the glass sheet (3, 3') by accelerating the glass sheet;
    wherein each of the flags is a plate immersed in the molten metal bath between the side wall of the float tank and an outer edge of the glass sheet (3, 3') without contacting the glass sheet, said plate extends above the molten metal bath in a side region adjacent to said side wall and is oriented substantially transverse to a feed direction of the glass sheet on the molten metal bath.

2. The process as defined in claim 1, wherein said flags (9) extend over an entire depth of the molten metal bath (2).

3. The process as defined in claim 1, wherein said flags (9) are made of graphite.

4. The process as defined in claim 1, wherein said flat glass substrate has a thickness of less than 1.5 mm with a difference between a smallest and largest thickness of the flat glass substrate of less than 50 µm.

* * * * *